United States Patent
Zhou et al.

(10) Patent No.: US 6,738,650 B1
(45) Date of Patent: May 18, 2004

(54) RADIATION SHIELDING TRI-BAND ANTENNA ADAPTED TO PROVIDE DUAL BAND POLARIZATIONS

(75) Inventors: Guangping Zhou, Lake Zurich, IL (US); Allen Ting Tsai, Chicago, IL (US); Bahadir Suleyman Yildirim, Irving, TX (US)

(73) Assignee: Motorola, Inc., Schaumburg, IL (US)

( * ) Notice: Subject to any disclaimer, the term of this patent is extended or adjusted under 35 U.S.C. 154(b) by 527 days.

(21) Appl. No.: 09/724,442

(22) Filed: Nov. 28, 2000

(Under 37 CFR 1.47)

(51) Int. Cl.[7] .................................................. H04B 1/38
(52) U.S. Cl. ................ 455/575.5; 455/344; 455/278.1; 455/289; 343/753; 343/781 R; 343/834; 343/851
(58) Field of Search ............................ 455/575.5, 575.8, 455/575.7, 90.1, 550.1, 347, 348, 344, 269, 274, 278.1, 283, 284, 286, 290; 343/753, 772, 781 R, 784, 790, 834, 841, 842, 851, 872, 873, 912, 916

(56) References Cited

U.S. PATENT DOCUMENTS

| | | | | |
|---|---|---|---|---|
| 5,335,366 A | | 8/1994 | Daniels | 455/575.5 |
| 5,338,896 A | * | 8/1994 | Danforth | 174/35 R |
| 5,444,455 A | * | 8/1995 | Louzir et al. | 343/895 |
| 5,444,866 A | * | 8/1995 | Cykiert | 455/575.5 |
| 5,507,012 A | * | 4/1996 | Luxon et al. | 455/575.5 |
| 5,550,552 A | * | 8/1996 | Oxley | 343/702 |
| 5,694,137 A | * | 12/1997 | Wood | 343/702 |
| 5,787,340 A | * | 7/1998 | Sepponen | 455/575.5 |
| 5,819,162 A | * | 10/1998 | Spann et al. | 455/575.5 |
| 5,826,201 A | * | 10/1998 | Gratias | 455/575.5 |
| 5,841,407 A | * | 11/1998 | Birnbaum | 343/895 |
| 6,088,603 A | * | 7/2000 | Wilson | 455/575.5 |
| 6,095,820 A | * | 8/2000 | Luxon et al. | 455/575.5 |
| 6,163,307 A | * | 12/2000 | Kim et al. | 343/895 |
| 6,181,920 B1 | * | 1/2001 | Dent et al. | 455/101 |
| 6,201,500 B1 | * | 3/2001 | Fujikawa | 343/702 |
| 6,314,277 B1 | * | 11/2001 | Hsu et al. | 455/117 |
| 2002/0009976 A1 | * | 1/2002 | Rashidi | 455/575.5 |
| 2002/0019252 A1 | * | 2/2002 | Kuroda | 455/575.5 |

FOREIGN PATENT DOCUMENTS

| WO | WO 96/21254 | | 11/1996 |
|---|---|---|---|
| WO | WO97/37401 | * | 9/1997 |

* cited by examiner

*Primary Examiner*—Charles Craver
(74) *Attorney, Agent, or Firm*—Hisashi D. Wata; Shigeharu Furuk

(57) ABSTRACT

A radiation shielding apparatus for a wireless communication device operable in at least two cellular frequency spectrums includes a multi-band antenna operably associated with an electromagnetic radiation shield that extends along a length of the antenna. The shield partially surrounds the antenna and is disposed between a user of the communication device and the antenna.

13 Claims, 3 Drawing Sheets

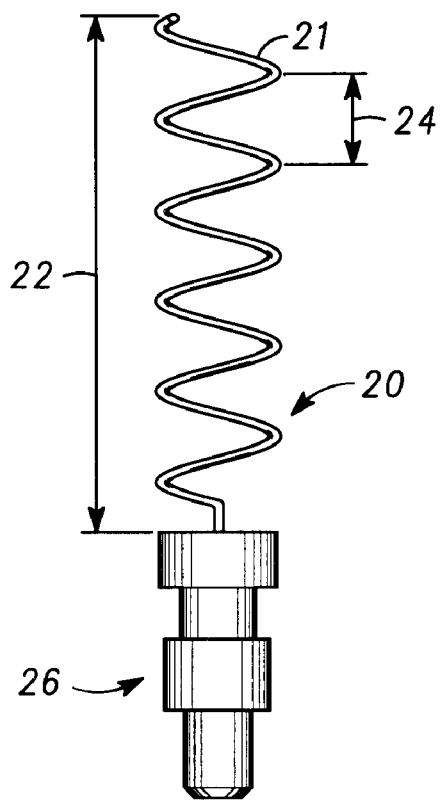
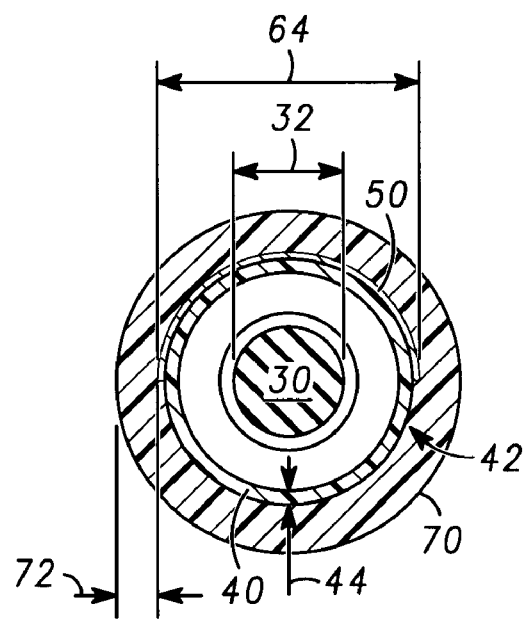
*FIG.1*  *FIG.2*

RADIATION SHIELDING TRI-BAND ANTENNA ADAPTED TO PROVIDE DUAL BAND POLARIZATIONS

FIELD OF THE INVENTION

The present invention relates to a radiation shielding device for radio transmitting devices. More particularly, the present invention pertains to a radiation shielding apparatus which is a tri-band antenna adapted to be tuned to give dual band polarizations.

BACKGROUND OF THE INVENTION

It is well known to shield circuitry from an electromagnetic wave radiation by providing a layer of electromagnetic wave shielding material between an electromagnetic wave source and circuitry and other circuitry to be protected. The shielding is provided to prevent the influence of the electromagnetic wave noise from affecting the protected circuit.

The transmission of electromagnetic waves from a portable cellular telephone is traditionally accomplished on the antenna. Hand-held cellular phones typically have transmitting/receiving units and an antenna is provided in the interior and/or on an exterior surface of the handset. Typically, hand-held cellular phones have a transmitting/receiving unit which is located on the handset, and includes a mouthpiece, an earpiece and the antenna, within a single compact unit. The antenna usually extends from the top surface of the handset, and it transmits and receives the electromagnetic wave radiation. The antenna may be either telescoping or fixed externally on the phone body. Alternatively, the antenna may be internally located. The antenna transmits electromagnetic wave radiation so as to send communication signals from the cellular phone to a distant cell located on a cellular network, and receives electromagnetic wave radiation during receipt of communication signals from the cell. The electromagnetic wave radiation transmitted by the antenna is generated by a transmitter disposed within the interior of the cellular phone's handset.

In U.S. Pat. No. 5,335,336 issued to Daniels, a shielding device was provided for a radio transmitting device, particularly a hand-held cellular phone, wherein the shielding device was externally mounted so as to fully or partially encompass the antenna. In another embodiment, the shielding device was incorporated directly into the shaft structure comprising the antenna. In each of the Daniels' devices, the shield was comprised of either an absorption, blocking, or reflecting material formed into a semi-circular arc, a fully enclosed arc, or was applied directly to the metallic substrate forming the antenna. The construction of the radiation shield member could also have various cross sectional configurations. For example, it could have the form of an open or closed box-shape, and open or closed curve, or could have been a flat planer member. One downside of the Daniels' electromagnetic shield was that due to its solid structure, it was only effective as a single band antenna, capable of only vertical polarization even if it is shaped into semi-circular, circular, or other geometric shapes. This means that should a user assume a position where the antenna is no longer vertical, the transmission and reception of the phone will be interrupted until the antenna is again positioned vertically.

Another problem with cellular phones which were produced less than 10 years ago, like the Daniels phone, is that they operated on a single 800 MHz band. Since then, cellular phone usage has exploded, with capacity on the 800 MHz band becoming saturated and hardly utilized by phone manufacturers. As a result of the explosive popularity in cell phone usage, more frequency bands were needed and in response, the FCC dedicated a new cellular band; the 1900 MHz band. However, that band is not adjacent to the 800 MHz band, meaning that phones must be capable of operating at dual bands of 800 and 1900 MHzs. The shielding device of Davis is limited to transmitting and receiving signals only on the 800 MHz band. Thus, if the antenna device of Daniels was incorporated into one of the cellular phones being produced today, the 1900 MHz signals would never be recognized and the phones would not work other than at 800 MHz. Furthermore, the phones operating in Europe are dedicated to still another cellular frequency band that is discrete from the 800 and 1900 MHz bands of the United States cellular system. The cellular bands dedicated to European usage operate at the 900 and 1800 MHz bands. Therefore, many worldwide businessmen encounter phone inactivation problems when traveling back and forth between continental Europe and the United States. Currently, one of the only solutions available is for businessmen to carry two phones; one capable of operating on the United States cellular bands and the other capable of operating on European cellular bands.

Therefore, there is a need to provide an improved shielding apparatus, which can also improve the capabilities of the antenna, in order to overcome the difficulties with the prior art, as mentioned above, and to provide an antenna which can be tuned to three cellular bands so that U.S. phones and European phones can be used interchangeably.

DETAILED DESCRIPTION OF THE DRAWINGS

FIG. 1 is a side view of one embodiment of a helical shaped antenna in accordance with the invention, mounted on a conventional screw feed;

FIG. 2 is a cross-sectional view of one embodiment of a radiation shielding apparatus in accordance with the present invention;

DETAILED DESCRIPTION OF THE PRESENTLY PREFERRED EMBODIMENTS

Figure 3:
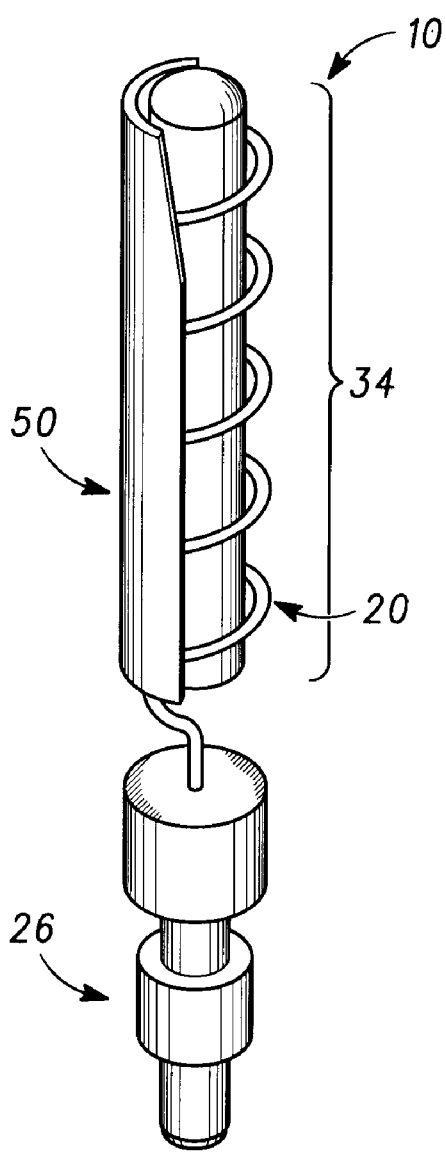
FIG. 3 is a perspective view showing the embodiment of FIG. 2 coupled with the antenna of FIG. 1.

Referring to FIGS. 1–4, one embodiment of a radiation shielding apparatus is generally shown at numeral 10. As FIG. 1 illustrates, the antenna portion of the radiation shielding apparatus 10 is shown at 20. The antenna portion 20 is known in the art as a helix coil, which is comprised of a continuous wire formed into a series of identical helical or looped formations 21 that are continuously arranged in a vertical fashion from each other. The wire can, for example, be made of pure copper or it can comprise a steel wire plated with either copper, silver or gold in order to add strength to the antenna so that it can satisfy various drop tests which are well known in the industry. Each helically shaped loop 21 can have an inside wire diameter of 4.5 millimeters, with the antenna portion 20 including a number of turns, in this case five turns, that can be spaced equidistant from each other. For example, the turns may be spaced a distance 24 from each other, thereby creating a total height of the antenna (helix coil) which is preferably about 19.5 millimeters, shown at 22. Although the height of the antenna is only 19.5 millimeters, it should be clear that because of the number of turns and the preferable separation of 3.0 mm between turns, the total length of the wire being used to form the antenna is actually about 88 millimeters long. In FIG. 1, the one end of the wire is connected to a typical screw connector 26, while in a second embodiment, shown in FIG. 4, the end of the wire is connected to a typical coaxial screw arrangement.

Referring to FIG. 2, the radiation shielding apparatus comprises an inner dielectric core 30 which has a diameter designated at 32. In the embodiment shown, core 30 may have a diameter 32 of 3.5 millimeters and a length 34 which is identical to the height 22 of the antenna. The dielectric core can be formed from any elastomeric material. The elastomeric material, in one embodiment, may have a permitivity of about 3 to 4. One tradeoff is that a high permitivity will reduce the size or height of the antenna but it also has the negative effect of reducing the band of the antenna. Insulating material 40 may be concentrically arranged with respect to the dielectric core 30. In one embodiment, the insulating material 40 may have a thickness 44 of about 0.3 millimeters. The insulating material may be made from the same elastomeric material used for the dielectric core. A circularly-shaped shield 50 may be arranged on an outside surface 42 of insulating material 40. As shown, the shield 50 may be contoured circular in cross-section to partially surround the insulating material.

Figure 5:
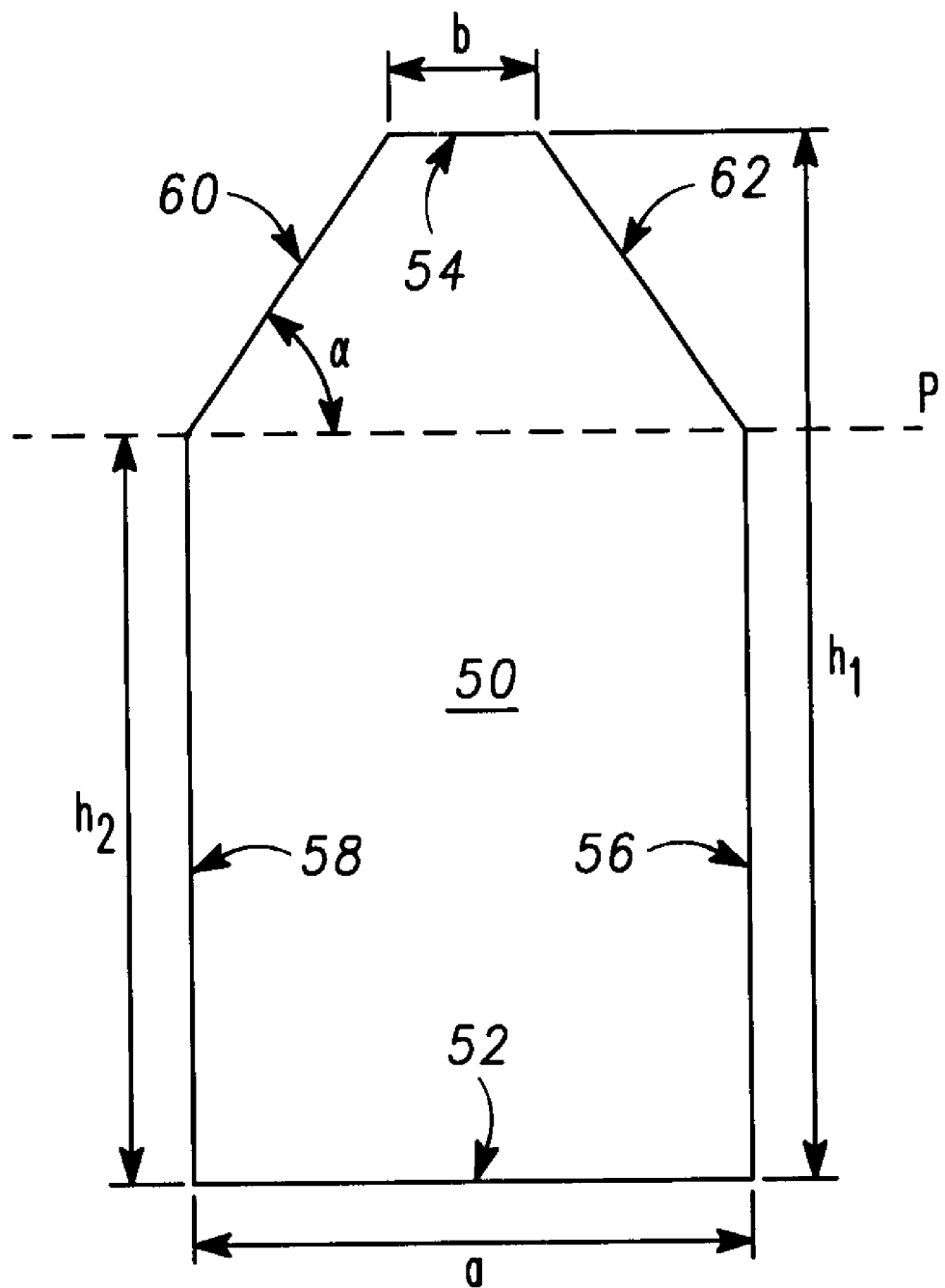
FIG. 5 is a frontal view of one embodiment of a radiation shield in a preformed state in accordance with the invention.

FIG. 5 illustrates a shield 50 in a preformed state, where the shield body may be flat or planar. In one embodiment, the shield body can be provided with six asymmetrical sides 52, 54, 56, 58, 60, and 62. At a lower portion of the shield 50, the base side 52 is horizontally disposed and has an extent or length identified by "a". At an upper or top portion of the shield 50, a top side 54 is disposed above and parallel to side 52 and has a length or extent identified as "b". In one embodiment, the longitudinal extent or length "b" is about half the extent "a" of side 52, although other lengths can be provided, preferably where the length of "b" is less than or equal to the length of "a". The vertically oriented sides 56 and 58 are disposed at perpendiculars to the base 52, and are laterally spaced apart from each other by the extent or length of the base, "a". Each side 56, 58 has an identical vertical length or extent, identified herein as "$h_2$". At the top portion of the shield 50, the sides 60 and 62 connect the sides 56 and 58 to the ends of side 54. Referring to FIG. 5, the sides can be disposed at the angle α with respect to the imaginary horizontal plane "P". In one embodiment, the angle α is about 35°, although the angle can be varied between 30–45°. The angle α allows the antenna to be tuned at one of the frequencies for allowing a cellular phone to operate at more than one frequency band. Angles less than the above range may have a very slight, if not negligible impact on improving the performance of the antenna. Angles greater than the above range may have a detrimental impact. The extent or length of each side 60,62, along with the length of each of the vertical sides 56, 58, give the shield a total vertical height or length identified at "$h_1$". The length of vertical sides 56,58 will always satisfy the relationship where $h_2$ is less than or equal to $h_1$.

Figure 4:
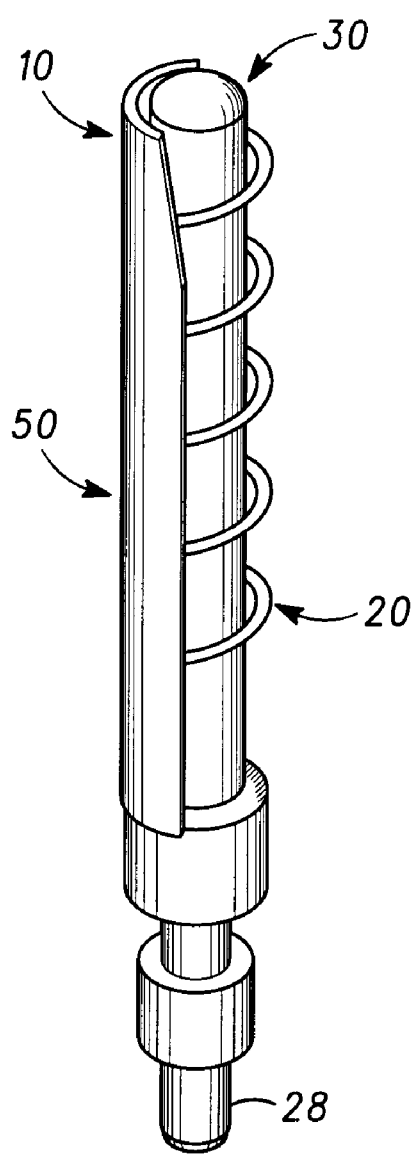
FIG. 4 is a perspective view showing the embodiment of FIG. 2 coupled with the antenna of FIG. 1, with the antenna being attached to a coaxial feed where the shield touches the ground of the coaxial cable.

Once the preformed shape as just described is provided, the shield is rolled into the final semicircular configuration that is seen in the FIGS. 3 and 4. The shield 50 can be comprised of a metallic material that, in one embodiment, is formed of steel with a copper overplating. After the shield is formed into its final, semicircular shape, the shield defines a concavity "C" that faces away from the user when he has the cellular phone positioned against his head. In use, the shield 50 is interposed between the user's head and the antenna 20. In one embodiment, the shield may have an outside diameter of 5 mm, which is identified at 64 in FIG. 2. Also forming part of the electromagnetic radiation redistribution assembly is the optional outer dielectric cover 70. Although not critical to the operation of the apparatus 10, the outer dielectric cover 70 is provided to protect the apparatus against various abuses such as dropping the cellular phone. The cover 70 does function to hold or support the shield 50 in position with respect to the dielectric core 30 and the insulating material 40. The cover 70 has a thickness designated at 72 and may be constructed of the same dielectric material as the core. In one embodiment, the cover 70 may also have the same permitivity.

The construction of a second embodiment of the present invention is shown in FIG. 4, and the construction of this antenna is identical to the antenna shown in FIGS. 1–3, except that the end of the wire is attached into a typical screw coaxial connector 28 known by those in the art. The coaxial cable includes a central signal carrier surrounded by a dielectric filling which in turn is surrounded by the electrical ground. When the coaxial connector 28 is connected to antenna portion 20, the ground on the coaxial cable touches the metallic shield 50. With the embodiment shown in FIG. 3, it should be understood that the bottom end, or base 52 of the shield 50 does not touch the screw connection 26, nor does it contact a ground. Furthermore, each embodiment respectively connects to a TR switch located inside the phone. This switch is a known component of cellular phones, therefore is not shown or described, although it should be clear that the TR switch makes electrical contact with a connector 26 or 28.

The operation of the radiation shielding apparatus 10 of the present invention will now be described. First of all, the semicircular configuration of the shield, as well as overall shape of the shield can have a direct connection with creating the various tunable cellular bands. The GSM band is determined by controlling the radial distance between the helical coil and the metallic shield. The DCS cellular band is controlled by the shape of the shield itself. In one embodiment, it was found that a hexagonal arrangement creates an ideal transmittal and reflection arrangement. Higher level of polygons also are acceptable but as the level of the polygon rises, for example, if a octagon-shaped shield was used, the angle between each of the sides of the polygon do not differ very much from the angle between the sides of a hexagon. Therefore, the more complex and higher level polygon provides insignificantly less advantage towards tuning this particular cellular band.

The simple helix antenna of the present invention has several resonance modes in the cellular frequency spectrum that are based on the physical dimensions of the helix itself. These resonances in which the return losses are minimized (maximum RF energy is transmitted to the antenna) can be adjusted by using tuning techniques such that the cellular bands i.e., GSM, DCS, and PCS coincide with these resonances both in frequency and in band. The metallic shield 50 serves this purpose by bringing the resonance mode down in frequency. The antenna portion 20 can then be tuned by simply adjusting the length of the helical wire, which is actually controlled by either adding or subtracting more turns to the wire. In one embodiment of the present invention, the antenna has been provided with five turns, with each turn having a diameter of 4.5 millimeters and such that the spacing between each turn is about 3 millimeters. In this embodiment, the overall wire length of the antenna is 88 millimeters, however, after the turns have been formed, the antenna has a freestanding height of 19.5 millimeters. As mentioned, the helically wound antenna has several resonance modes and when the shield is added, the resonance modes are shifted downwardly in frequency and thus can be adjustable to work in the three cellular bands, the GSM band (900 MHz), the DCS band (1800 MHz), and the PCS band (1900 MHZ). The GSM and DCS bands correspond to the European cellular bands, while the PCS band corresponds to the U.S. band.

The unique tuning mechanism for this triband antenna is the electromagnetic coupling between the hexagonally-shaped shield 50 and the helically wound wire coil which forms the antenna portion 20. The angles and the lengths of each side of the hexagon are two additional tuning parameters that can be used to tune the coupling between the shield 50 and the coil, in addition to being able to tune the distance between them. Generally speaking, for a single band antenna, only a distance parameter is needed to tune the resonating frequency onto a specified frequency. For a triband antenna like the present invention, three parameters are required (distance, angle and length). To tune the three resonating frequencies on the three specified frequencies, the tuning mechanism is the interaction between the shield and the wire coil since the wire coil can be effectively broken down into small individual short dipoles and small loops. The summation of the small dipoles is effectively equivalent to a single, large-whip radiating element like the ones typically disclosed in the prior art and which produce only vertical polarization. The summation of the several individual small loops is equivalent to a single, large loop radiating element, however, the small loops produce a horizontal polarization in addition to the vertical polarization. Therefore, the present antenna is capable of generating both horizontal and vertical polarization. Thus, the user will have greater capability as far as using the cellular telephone in a number of various positions with respect to his body, without fear of having the signal cut-out, which is common with a single polarization (vertical) that is typical with most cellular phone antennas.

While the apparatus and methods herein disclose formed preferred embodiment of this invention, this invention is not limited to those specific apparatus and methods, and changes can be made therein without departing from the scope of this invention which is defined in the appended claims.

We claim:

1. A radiation shielding apparatus for a wireless communication device operable in at least two cellular frequency spectrums, comprising:
   a multi-band antenna including an elongated coil; and
   a shield positioned adjacent the multi-band antenna including an upper portion angled to allow the multi-band antenna to be tuned to the at least two cellular frequency spectrums,
   wherein the shield is a metallic material formed into an asymmetrical hexagonal shape having a top portion defined by angled sides, the angled sides adapted to be adjusted to tune the antenna.

2. The radiation shielding apparatus of claim 1, wherein the shield extends along the length of the elongated coil, partially surrounding the elongated coil.

3. The radiation shielding apparatus of claim 2, wherein a distance between the shield and the elongated coil is adapted to be adjusted to tune the antenna.

4. The radiation shielding apparatus of claim 3, wherein the shield and the elongated coil are electromagnetically coupled together and wherein the shield is used to tune the multi-band antenna to achieve at least two resonant frequencies.

5. The radiation shielding apparatus of claim 4, wherein each of the at least two resonant frequencies are tuned to coincide with the at least two frequency spectrums.

6. A radiation shielding apparatus for a wireless communication device operable in at least two cellular frequency spectrums, comprising:
   a multi-band antenna including an elongated coil; and
   a shield positioned adjacent the multi-band antenna including an upper portion angled to allow the multi-band antenna to be tuned to the at least two cellular frequency spectrums,
   wherein the shield has three tunable parameters based upon a distance between the shield and the elongated coil, an angle provided in the sides that define the top portion or the shield, and the length or the elongated coil.

7. The radiation shielding apparatus of claim 6, wherein the radiation shield apparatus further comprises a solid cylindrical dielectric core, a circularly shaped insulating material concentrically arranged respective the dielectric core, and wherein the shield is arranged externally of the insulating material.

8. The radiation shielding apparatus of claim 7, wherein the shield is contacting the insulating material and wherein the elongated coil is disposed between the dielectric core and the insulating material.

9. The radiation shielding apparatus of claim 8, further including a cover surrounding the radiation shielding apparatus, the cover made of the same dielectric material as the solid cylindrical dielectric core.

10. The radiation shielding apparatus of claim 9, wherein the elongated coil is adapted to connect to a conventional screw connector that is in contact with a transmit-receive switch.

11. The radiation shielding apparatus of claim 9, wherein the elongated coil connects to a signal conductor of a coaxial cable feed, the coaxial cable feed in contact with a transmit-receive switch.

12. The radiation shielding apparatus of claim 11, wherein the shield is metallic and includes a lower portion adapted to contact with a ground.

13. A method of forming an antenna that is operable in at least two cellular frequency spectrums, the method comprising:
   forming a metallic asymmetrical hexagonal shield of a predetermined shield length with a top portion having angled sides;
   forming an antenna including an elongated coil over a predetermined antenna length that substantially corresponds to the predetermined shield length;
   positioning the metallic asymmetrical hexagonal shield adjacent to the antenna; and
   adjusting predetermined parameters for tuning the antenna to at least two cellular frequency spectrums,
   wherein the predetermined parameters are based upon a distance between the metallic asymmetrical hexagonal shield and the elongated coil, an angle provided in the angled sides of the top portion of the metallic asymmetrical hexagonal shield, and the length of the elongated coil.

* * * * *